US012673700B2

(12) United States Patent     (10) Patent No.:   US 12,673,700 B2

White          (45) Date of Patent:     Jul. 7, 2026

(54) SYSTEMS AND METHODS FOR AUTONOMOUS VEHICLE ANCHOR POINT TRACKING

(71) Applicant: TORC Robotics, Inc., Blacksburg, VA (US)

(72) Inventor: Jacob White, Blacksburg, VA (US)

(73) Assignee: TORC ROBOTICS, INC., Blacksburg, VA (US)

( * ) Notice: Subject to any disclaimer, the term of this patent is extended or adjusted under 35 U.S.C. 154(b) by 416 days.

(21) Appl. No.: 18/219,597

(22) Filed: Jul. 7, 2023

(65) Prior Publication Data

US 2025/0010888 A1     Jan. 9, 2025

(51) Int. Cl.
    *B60W 60/00*     (2020.01)
    *G06V 20/58*     (2022.01)

(52) U.S. Cl.
    CPC ......... B60W 60/0027 (2020.02); G06V 20/58 (2022.01); B60W 2554/4041 (2020.02)

(58) Field of Classification Search
None
See application file for complete search history.

(56) References Cited

U.S. PATENT DOCUMENTS

| | | | | |
|---|---|---|---|---|
| 2019/0265331 A1* | 8/2019 | Lee | ........................ | G01S 7/4052 |
| 2020/0193686 A1* | 6/2020 | Chong | ..................... | G06T 7/70 |
| 2022/0315051 A1* | 10/2022 | Patel | ..................... | B60W 40/04 |
| 2023/0242158 A1* | 8/2023 | Katzourakis | .......... | G01S 13/867 |
| | | | | 701/23 |

FOREIGN PATENT DOCUMENTS

| | | | | | |
|---|---|---|---|---|---|
| CN | 114502428 A | * | 5/2022 | ........ | B60W 50/0097 |
| CN | 115782917 A | * | 3/2023 | | |
| JP | 2013168012 A | * | 8/2013 | | |
| KR | 20100134154 A | * | 12/2010 | ............... | H04N 7/18 |

* cited by examiner

*Primary Examiner* — Justin S Lee

(74) *Attorney, Agent, or Firm* — Armstrong Teasdale LLP

(57) ABSTRACT

An autonomous vehicle comprises a sensor and one or more processors. The one or more processors can be configured to receive a set of object location data from the sensor, the set of object location data indicating an object; generate a measured representation of the object based on the set of object location data; execute a tracking protocol using data of the measured representation of the object as input to generate a virtual representation of the object, the virtual representation of the object comprising a virtual point that is nearest to a defined location of the autonomous vehicle; and translate the virtual point of the virtual representation of the object to a measured point of the measured representation of the object.

20 Claims, 6 Drawing Sheets

SYSTEMS AND METHODS FOR AUTONOMOUS VEHICLE ANCHOR POINT TRACKING

TECHNICAL FIELD

The present disclosure relates generally to autonomous vehicles and, more specifically, to systems and methods for automatically determining points of external objects to use for autonomous driving.

BACKGROUND

The use of autonomous vehicles has become increasingly prevalent in recent years, with the potential for numerous benefits, such as improved safety, reduced traffic congestion, and increased mobility for people with disabilities. For proper operation, autonomous vehicles can collect large amounts of data regarding the surrounding environment. Such data may include data regarding other vehicles driving on the road, identifications of traffic regulations that apply (e.g., speed limits from speed limit signs or traffic lights), or other objects that impact how autonomous vehicles may drive safely. Autonomous vehicles may use such data to determine or predict the movements of objects in the surrounding environment.

SUMMARY

Autonomous vehicles may identify specific points on objects on the road to determine or predict various characteristics regarding the objects. For instance, to determine the velocity or acceleration of another vehicle on the road, an autonomous vehicle may identify a specific point on the other vehicle and track the point's location over time. The autonomous vehicle may compare the differences in location over time to determine the velocity or acceleration of the vehicle, in some cases in addition to determining a position of the vehicle relative to the autonomous vehicle. Autonomous vehicles may determine such points to be in the middle of detected objects using sensor data that the autonomous vehicles collect while driving.

Using middle points of objects as a basis to determine the velocity or acceleration of objects can cause inaccuracies in an autonomous vehicle's determinations regarding characteristics of the objects. Such inaccuracies may occur, for example, when the autonomous vehicle collects further data regarding an object that causes the autonomous vehicle to adjust the autonomous vehicle's understanding of the size or shape of the object. For instance, an autonomous vehicle may use light detection and ranging (LiDAR) data to detect a vehicle passing the autonomous vehicle in a lane next to the autonomous vehicle. Because the passing vehicle may initially be far away from the autonomous vehicle, the autonomous vehicle may initially have a small amount of data to use to estimate or determine the size of the passing vehicle. Accordingly, the autonomous vehicle may initially determine the shape and size of the passing vehicle to be small. The autonomous vehicle may set a point in the middle of the estimated shape. As the autonomous vehicle collects more data regarding the passing vehicle (e.g., as the vehicle gets closer and passes the autonomous vehicle), the autonomous vehicle may determine the passing vehicle is larger than initially estimated. The autonomous vehicle may determine a new larger shape and size of the passing vehicle and set the middle point of the autonomous vehicle in the larger shape. The shift in the size of the shape can cause the autonomous vehicle to determine changes in velocity, acceleration, position, or other characteristics of the passing vehicle that result from changes in the determined shape of the passing vehicle rather than how the passing vehicle is traveling. Such changes can result in improper "jumps" in such characteristics that could cause improper estimations or predictions regarding how the vehicle is operating or moving.

An autonomous vehicle implementing the systems and methods described herein can avoid such improper determinations using "near point" adjustment techniques. For instance, upon identifying an object (e.g., another vehicle) while driving, the autonomous vehicle may identify a point on the object that is nearest to the autonomous vehicle. The autonomous vehicle may do so, for example, using object recognition techniques on data collected regarding the object, such as using edge detection techniques. The autonomous vehicle may periodically determine the nearest point on the object to the autonomous vehicle while driving. The autonomous vehicle may compare sequentially determined nearest points on the object with each other to determine characteristics of the object, such as velocity, acceleration, and/or location relative to the autonomous vehicle. By using the nearest point to determine characteristics of objects instead of projected middle points, the autonomous vehicle can determine characteristics of the objects irrespective of any projected or estimated sizes of the objects. Accordingly, the autonomous vehicle can avoid the inaccuracies caused by jumps that may occur when using projected middle points of objects to determine the characteristics.

In some cases, to determine the characteristics of objects, an autonomous vehicle may use a combination of measured representations of objects and virtual representations (e.g., tracked representations) of the same objects. For instance, a sensor (e.g., a LiDAR sensor or a radar sensor) of the autonomous vehicle can collect data over time and transmit the data to a processor of the autonomous vehicle. The processor can use the collected data from the sensor to determine a representation (e.g., a measured representation) of the object. The processor can use the measured representation (e.g., data of the measured representation, such as the set of data) to generate a virtual representation (e.g., a tracked representation) of the object, such as by executing a Gaussian or a Kalman filter on the measured representation. The processor can determine a nearest point to the autonomous vehicle on the virtual representation. The processor can translate the nearest point on the virtual representation to the nearest point on the measured representation. The processor can use the nearest points of the virtual representation and the measured representation to determine characteristics of the object (e.g., by tracking or determining changes in position (e.g., location) of the nearest points of the virtual representation or the measured representation or differences in position between points of the virtual representation and the measured representation over time).

One drawback of using both virtual representations (e.g., tracked representations) of objects and measured representations of objects is that the virtual representations and measured representations may have different shapes or shapes of different sizes. For example, because, in some cases, a virtual representation of an object and a measured representation of the same object can be determined using different algorithms and/or different data, the processor may determine different shapes and/or sizes between the virtual representation of the object and the measured representation of the object. The differences in the representations can cause the nearest points on the respective representations to represent different positions on the object. Further, the differences can cause changes in points to indicate improper changes of different magnitudes. Thus, any characteristics that the processor determines based on the representations may be inaccurate and/or subject to similar jumps to the jumps that can occur when using center points to determine the characteristics.

To reduce differences between the nearest points on virtual representations of objects and measured representations of objects, a processor can couple a virtual representation of an object with a measured representation of the same object. For example, the processor can generate a virtual representation of an object while the autonomous vehicle drives down the road based on a measured representation of the same object. The processor can identify a virtual point of the virtual representation of the object that is nearest to the autonomous vehicle. The processor can translate the virtual point to a measured point of the measured representation. The processor can use the measured point to determine one or more characteristics of the object.

In at least one aspect, the present disclosure describes an autonomous vehicle. The autonomous vehicle can include a sensor configured to generate object location data of an environment surrounding the autonomous vehicle; and one or more processors. The one or more processors can be configured to receive a set of object location data from the sensor, the set of object location data indicating an object in the environment surrounding the autonomous vehicle; generate a measured representation of the object based on the set of object location data; execute a tracking protocol using data of the measured representation of the object as input to generate a virtual representation of the object, the virtual representation of the object comprising a virtual point that is nearest to a defined location of the autonomous vehicle; and translate the virtual point of the virtual representation of the object to a measured point of the measured representation of the object.

In another aspect, the present disclosure describes a method. The method can include receiving, by one or more processors of an autonomous vehicle from a sensor of the autonomous vehicle, a set of object location data, the set of object location data indicating an object in an environment surrounding the autonomous vehicle; generating, by the one or more processors, a measured representation of the object based on the set of object location data; executing, by the one or more processors, a tracking protocol using data of the measured representation of the object as input to generate a virtual representation of the object, the virtual representation of the object comprising a virtual point that is nearest to a defined location of the autonomous vehicle; and translating, by the one or more processors, the virtual point of the virtual representation of the object to a measured point of the measured representation of the object.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting and it may be readily understood that certain aspects of the disclosed systems and methods can be variously arranged and combined, all of which arrangements and combinations are contemplated by this disclosure.

Figure 1:
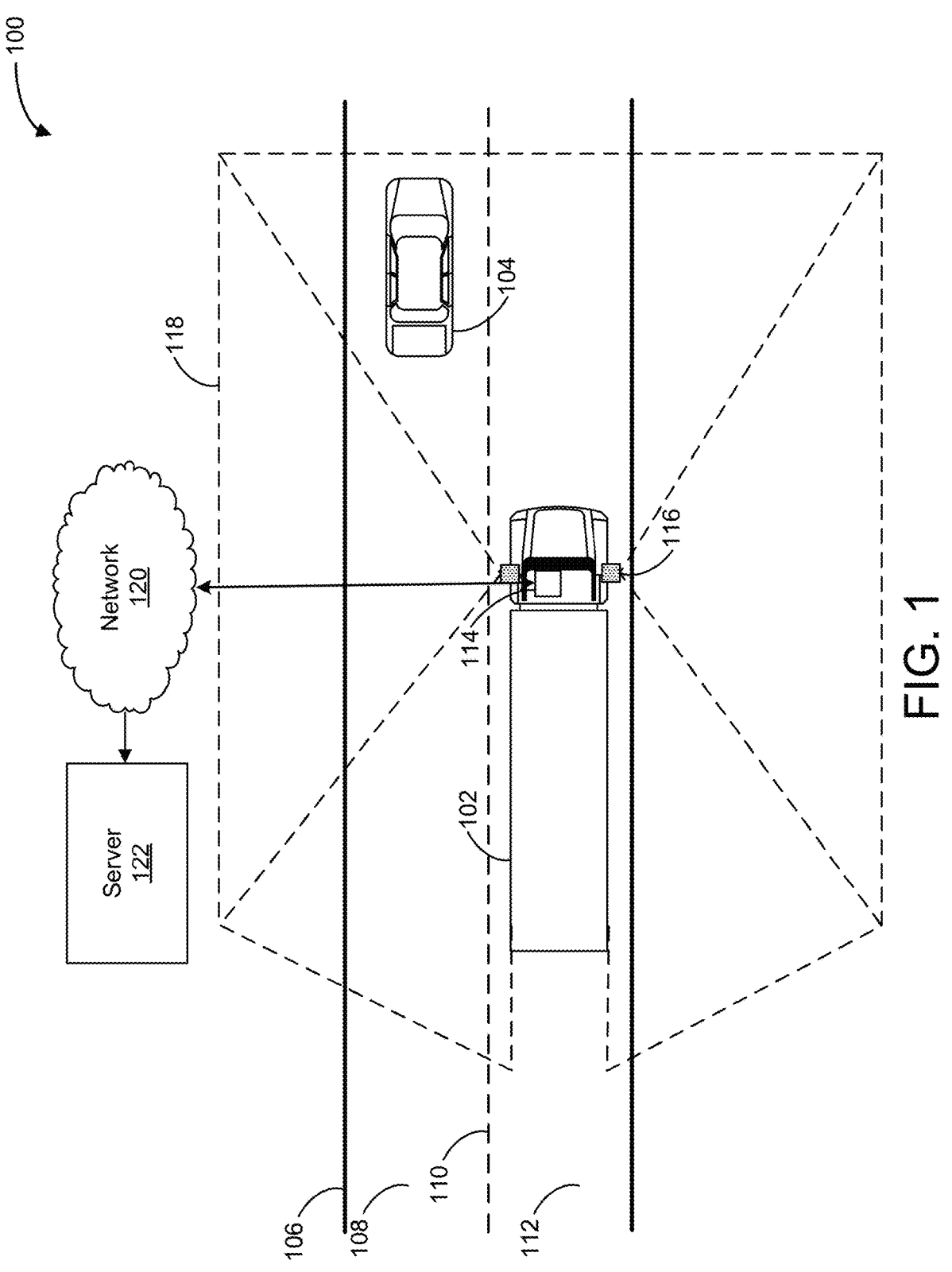
FIG. 1 is a bird's-eye view of a roadway including a schematic representation of a vehicle and aspects of an autonomy system of the vehicle, according to an embodiment.

Referring to FIG. 1, the present disclosure relates to autonomous vehicles, such as an autonomous vehicle 102 having an autonomy system 114. The autonomy system 114 of the vehicle 102 may be completely autonomous (fully autonomous), such as self-driving, driverless, or Level 4 autonomy, or semi-autonomous, such as Level 3 autonomy. As used herein the term "autonomous" includes both fully autonomous and semi-autonomous. The present disclosure sometimes refers to autonomous vehicles as ego vehicles. The autonomy system 114 may be structured on at least three aspects of technology: (1) perception, (2) maps/localization, and (3) behaviors planning and control. The function of the perception aspect is to sense an environment surrounding the vehicle 102 and interpret the environment. To interpret the surrounding environment, a perception module 116 or engine in the autonomy system 114 of the vehicle 102 may identify and classify objects or groups of objects in the environment. For example, a perception module 116 may be associated with various sensors (e.g., light detection and ranging (LiDAR), camera, radar, etc.) of the autonomy system 114 and may identify one or more objects (e.g., pedestrians, vehicles, debris, etc.) and features of the roadway (e.g., lane lines) around the vehicle 102, and classify the objects in the road distinctly.

The maps/localization aspect of the autonomy system 114 may be configured to determine where on a pre-established digital map the vehicle 102 is currently located. One way to do this is to sense the environment surrounding the vehicle 102 (e.g., via the perception module 116), such as by detecting vehicles (e.g., a vehicle 104) or other objects (e.g., traffic lights, speed limit signs, pedestrians, signs, road markers, etc.) from data collected via the sensors of the autonomy system 114, and to correlate features of the sensed environment with details (e.g., digital representations of the features of the sensed environment) on the digital map.

Once the systems on the vehicle 102 have determined the location of the vehicle 102 with respect to the digital map features (e.g., location on the roadway, upcoming intersections, road signs, etc.), the vehicle 102 can plan and execute maneuvers and/or routes with respect to the features of the digital map. The behaviors, planning, and control aspects of the autonomy system 114 may be configured to make decisions about how the vehicle 102 should move through the environment to get to the goal or destination of the vehicle 102. The autonomy system 114 may consume information from the perception and maps/localization modules to know where the vehicle 102 is relative to the surrounding environment and what other objects and traffic actors are doing.

FIG. 1 further illustrates an environment 100 for modifying one or more actions of the vehicle 102 using the autonomy system 114. The vehicle 102 is capable of communicatively coupling to a remote server 122 via a network 120. The vehicle 102 may not necessarily connect with the network 120 or the server 122 while it is in operation (e.g., driving down the roadway). That is, the server 122 may be remote from the vehicle, and the vehicle 102 may deploy with all the necessary perception, localization, and vehicle control software and data necessary to complete the vehicle 102's mission fully autonomously or semi-autonomously.

While this disclosure refers to a vehicle 102 as the autonomous vehicle, it is understood that the vehicle 102 could be any type of vehicle including a truck (e.g., a tractor trailer), an automobile, a mobile industrial machine, etc. While the disclosure will discuss a self-driving or driverless autonomous system, it is understood that the autonomous system could alternatively be semi-autonomous having varying degrees of autonomy or autonomous functionality or not be autonomous at all. While the perception module 116 is depicted as being located at the front of the vehicle 102, the perception module 116 may be a part of a perception system with various sensors placed at different locations throughout the vehicle 102.

Figure 2:
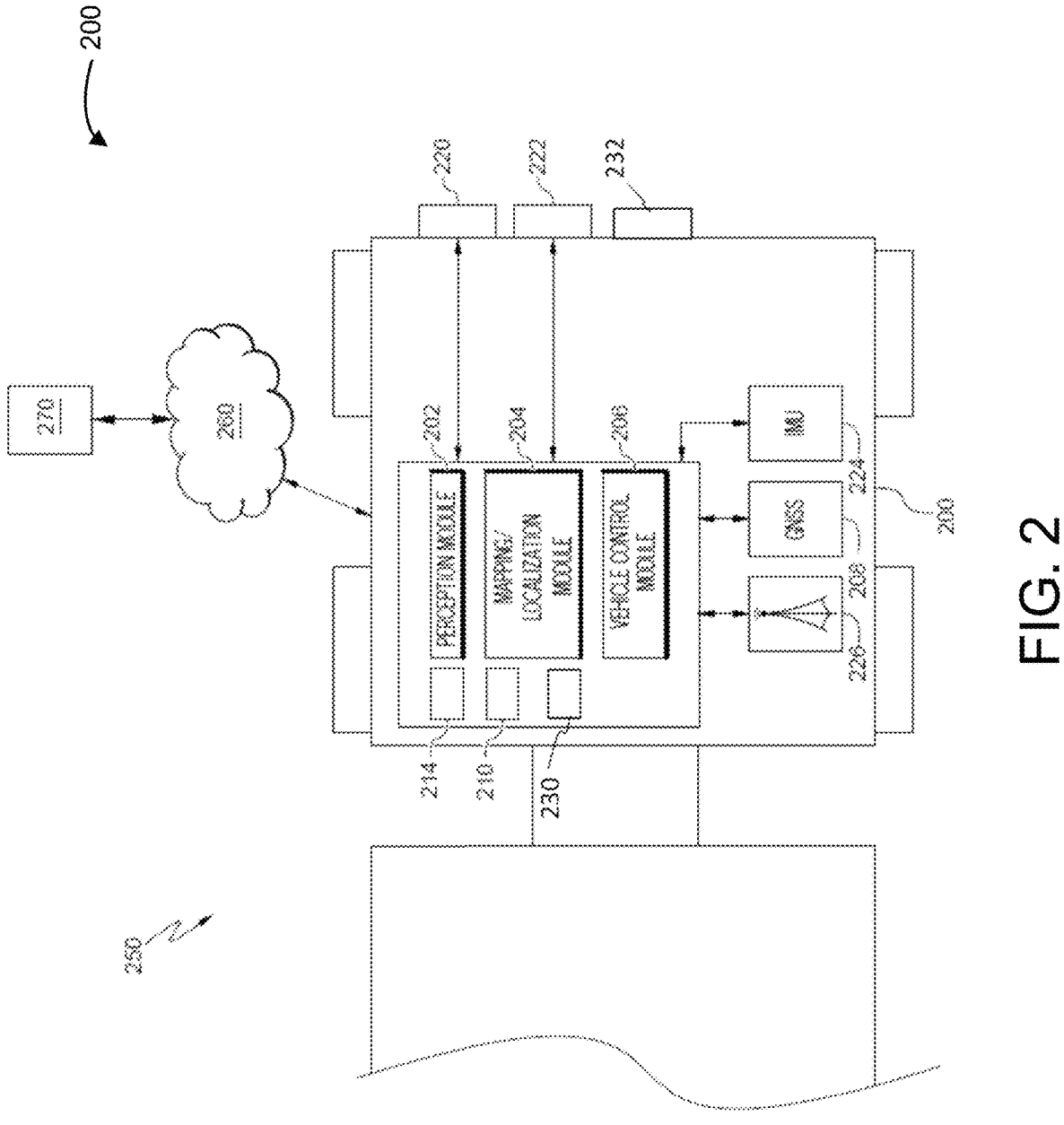
FIG. 2 is a system for autonomous vehicle anchor point tracking, according to an embodiment.

FIG. 2 illustrates an example schematic of an autonomy system 250 of a vehicle 200, according to some embodiments. The autonomy system 250 may be the same as or similar to the autonomy system 114. The vehicle 200 may be the same as or similar to the vehicle 102. The autonomy system 250 may include a perception system including a camera system 220, a light detection and ranging (LiDAR) system 222, a radar system 232, a Global Navigation Satellite System (GNSS) receiver 208, an inertial measurement unit (IMU) 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include more, fewer, or different components or systems, and each of the components or system(s) may include more, fewer, or different components. Additionally, the systems and components shown may be combined or divided in various ways. As shown in FIG. 1, the perception systems aboard the autonomous vehicle may help the vehicle 102 perceive the vehicle 102's environment out to a perception area 118. The actions of the vehicle 102 may depend on the extent of the perception area 118. It is to be understood that the perception area 118 is an example area, and the practical area may be greater than or less than what is depicted.

The camera system 220 of the perception system may include one or more cameras mounted at any location on the vehicle 102, which may be configured to capture images of the environment surrounding the vehicle 102 in any aspect or field of view (FOV). The FOV can have any angle or aspect such that images of the areas ahead of, to the side, and behind the vehicle 102 may be captured. In some embodiments, the FOV may be limited to particular areas around the vehicle 102 (e.g., forward of the vehicle 102) or may surround 360 degrees of the vehicle 102. In some embodiments, the image data generated by the camera system(s) 220 may be sent to the perception module 202 and stored, for example, in memory 214.

The LiDAR system 222 may include a laser generator and a detector and can send and receive LiDAR signals. A LiDAR signal can be emitted to and received from any direction such that LiDAR point clouds (or "LiDAR images") of the areas ahead of, to the side, and behind the vehicle 200 can be captured and stored as LiDAR point clouds. In some embodiments, the vehicle 200 may include multiple LiDAR systems and point cloud data from the multiple systems may be stitched together.

The radar system 232 may estimate strength or effective mass of an object, as objects made out of paper or plastic may be weakly detected. The radar system 232 may be based on 24 GHz, 77 GHz, or other frequency radio waves. The radar system 232 may include short-range radar (SRR), mid-range radar (MRR), or long-range radar (LRR). One or more sensors may emit radio waves, and a processor may process received reflected data (e.g., raw radar sensor data) from the emitted radio waves.

In some embodiments, inputs from the camera system 220, the LiDAR system 222, and the radar system 232 may be fused (e.g., in the perception module 202). The LiDAR system 222 may include one or more actuators to modify a position and/or orientation of the LiDAR system 222 or components thereof. The LiDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud and the point cloud may be rendered to visualize the environment surrounding the vehicle 200 (or object(s) therein). In some embodiments, the point cloud may be rendered as one or more polygon(s) or mesh model(s) through, for example, surface reconstruction. Collectively, the radar system 232, the LiDAR system 222, and the camera system 220 may be referred to herein as "imaging systems."

The GNSS receiver 208 may be positioned on the vehicle 200 and may be configured to determine a location of the vehicle 200 via GNSS data, as described herein. The GNSS receiver 208 may be configured to receive one or more signals from a global navigation satellite system (GNSS) (e.g., a GPS) to localize the vehicle 200 via geolocation. The GNSS receiver 208 may provide an input to and otherwise communicate with the mapping/localization module 204 to, for example, provide location data for use with one or more digital maps, such as an HD map (e.g., in a vector layer, in a raster layer or other semantic map, etc.). In some embodiments, the GNSS receiver 208 may be configured to receive updates from an external network.

The IMU 224 may be an electronic device that measures and reports one or more features regarding the motion of the vehicle 200. For example, the IMU 224 may measure a velocity, acceleration, angular rate, and/or an orientation of the vehicle 200 or one or more of the vehicle 200's individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204 to help determine a real-time location of the vehicle 200 and predict a location of the vehicle 200 even when the GNSS receiver 208 cannot receive satellite signals.

The transceiver 226 may be configured to communicate with one or more external networks 260 via, for example, a wired or wireless connection in order to send and receive information (e.g., to a remote server 270). The wireless connection may be a wireless communication signal (e.g., Wi-Fi, cellular, LTE, 5G, etc.). In some embodiments, the transceiver 226 may be configured to communicate with external network(s) via a wired connection, such as, for example, during initial installation, testing, or service of the autonomy system 250 of the vehicle 200. A wired/wireless connection may be used to download and install various lines of code in the form of digital files (e.g., HD digital maps), executable programs (e.g., navigation programs), and other computer-readable code that may be used by the system 250 to navigate the vehicle 200 or otherwise operate the vehicle 200, either fully autonomously or semi-autonomously.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. The autonomy system 250 may include a single processor or microprocessor or multiple processor or microprocessors that may include means for controlling the vehicle 200 to switch lanes and monitoring and detecting other vehicles. Numerous commercially available microprocessors can be configured to perform the functions of the autonomy system 250. It should be appreciated that the autonomy system 250 could include a general machine controller capable of controlling numerous other machine functions. Alternatively, a special-purpose machine controller could be provided. Further, the autonomy system 250, or portions thereof, may be located remote from the system 250. For example, one or more features of the mapping/localization module 204 could be located remote to the vehicle 200. Various other known circuits may be associated with the autonomy system 250, including signal-conditioning circuitry, communication circuitry, actuation circuitry, and other appropriate circuitry.

Figure 3:
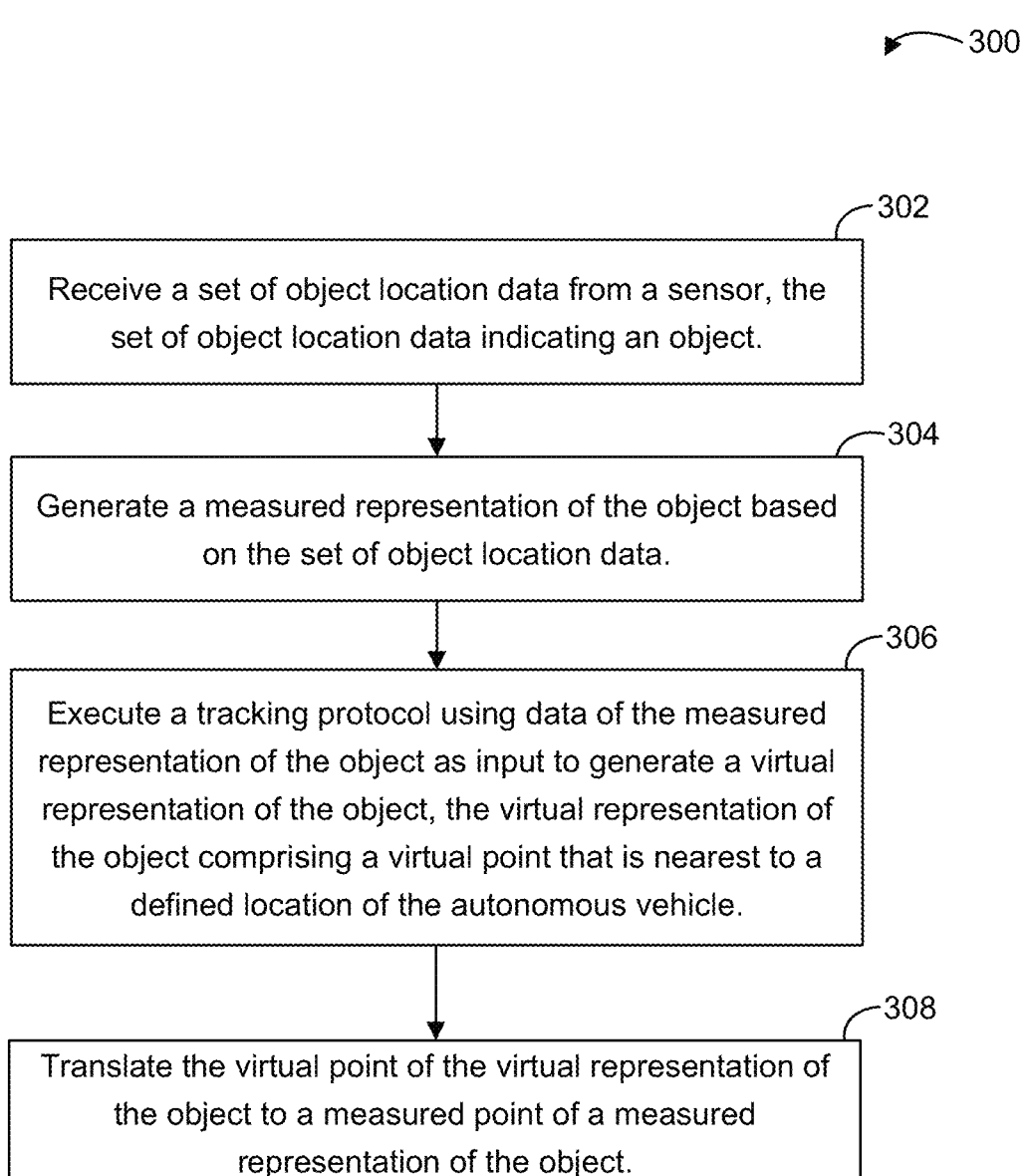
FIG. 3 is a method of autonomous vehicle anchor point tracking, according to an embodiment.

The memory 214 of the autonomy system 250 may store data and/or software routines that may assist the autonomy system 250 in performing autonomy system 250's functions, such as the functions of the perception module 202, the mapping/localization module 204, the vehicle control module 206, an object tracking module 230, and the method 300 described herein with respect to FIG. 3. Further, the memory 214 may also store data received from various inputs associated with the autonomy system 250, such as perception data from the perception system.

As noted above, the perception module 202 may receive input from the various sensors, such as the camera system 220, the LiDAR system 222, the GNSS receiver 208, and/or the IMU 224 (collectively "perception data") to sense an environment surrounding the vehicle 200 and interpret it. To interpret the surrounding environment, the perception module 202 (or "perception engine") may identify and classify objects or groups of objects in the environment. For example, the vehicle 102 may use the perception module 202 to identify one or more objects (e.g., pedestrians, vehicles, debris, etc.) or features of the roadway 106 (e.g., intersections, road signs, lane lines, etc.) before or beside a vehicle and classify the objects in the road. In some embodiments, the perception module 202 may include an image classification function and/or a computer vision function.

The system 250 may collect perception data. The perception data may represent the perceived environment surrounding the vehicle, for example, and may be collected using aspects of the perception system described herein. The perception data can come from, for example, one or more of the LiDAR system, the camera system, the radar system and various other externally-facing sensors and systems on board the vehicle (e.g., the GNSS receiver, etc.). For example, in vehicles having a sonar or radar system, the sonar and/or radar systems may collect perception data. As the vehicle 102 travels along the roadway 106, the system 250 may continually receive data from the various systems on the vehicle 102. In some embodiments, the system 250 may receive data periodically and/or continuously. With respect to FIG. 1, the vehicle 102 may collect perception data that indicates the presence of the lane line 110 (e.g., in order to determine the lanes 108 and 112). Additionally, the detection systems may detect the vehicle 104 and monitor the vehicle 104 to estimate various properties of the vehicle 104 (e.g., proximity, speed, behavior, flashing light, etc.). The properties of the vehicle 104 may be stored as timeseries data in which timestamps indicate the times in which the different properties were measured or determined. The features may be stored as points (e.g., vehicles, signs, small landmarks, etc.), lines (e.g., lane lines, road edges, etc.), or polygons (e.g., lakes, large landmarks, etc.) and may have various properties (e.g., style, visible range, refresh rate, etc.), which properties may control how the system 250 interacts with the various features.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module that may be communicatively coupled to a repository of images or image data (e.g., visual data and/or point cloud data) which may be used to determine objects and/or features in real-time image data captured by, for example, the camera system 220 and the LiDAR system 222. In some embodiments, the image classification function may be configured to classify features based on information received from only a portion of the multiple available sources. For example, in the case that the captured visual camera data includes images that may be blurred, the system 250 may identify objects based on data from one or more of the other systems (e.g., the LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the vehicle 200 (e.g., lane lines). The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of the vehicle 200's motion, size, etc.).

The mapping/localization module 204 receives perception data that can be compared to one or more digital maps stored in the mapping/localization module 204 to determine where the vehicle 200 is in the world and/or where the vehicle 200 is on the digital map(s). In particular, the mapping/localization module 204 may receive perception data from the perception module 202 and/or from the various sensors sensing the environment surrounding the vehicle 200 and correlate features of the sensed environment with details (e.g., digital representations of the features of the sensed environment) on the one or more digital maps. The digital map may have various levels of detail and can be, for example, a raster map, a vector map, etc. The digital maps may be stored locally on the vehicle 200 and/or stored and accessed remotely.

The vehicle control module 206 may control the behavior and maneuvers of the vehicle 200. For example, once the systems on the vehicle 200 have determined the vehicle 200's location with respect to map features (e.g., intersections, road signs, lane lines, etc.) the vehicle 200 may use the vehicle control module 206 and the vehicle 200's associated systems to plan and execute maneuvers and/or routes with respect to the features of the environment. The vehicle control module 206 may make decisions about how the vehicle 200 will move through the environment to get to the vehicle 200's goal or destination as it completes the vehicle 200's mission. The vehicle control module 206 may consume information from the perception module 202 and the mapping/localization module 204 to know where it is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle steering system, a propulsion system, and/or a braking system. The propulsion system may be configured to provide powered motion for the vehicle 200 and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the vehicle 200. The steering system may be any combination of mechanisms configured to adjust the heading or direction of the vehicle 200. The brake system may be, for example, any combination of mechanisms configured to decelerate the vehicle 200 (e.g., friction braking system, regenerative braking system, etc.) The vehicle control module 206 may be configured to avoid obstacles in the environment surrounding the vehicle 200 and may be configured to use one or more system inputs to identify, evaluate, and modify a vehicle trajectory. The vehicle control module 206 is depicted as a single module, but can be any combination of software agents and/or hardware modules able to generate vehicle control signals operative to monitor systems and control various vehicle actuators. The vehicle control module 206 may include a steering controller for vehicle lateral motion control and a propulsion and braking controller for vehicle longitudinal motion.

The object tracking module 230 may be configured to generate representations of objects in the environment surrounding the vehicle 102 while the vehicle 102 is driving. For example, the object tracking module 230 can receive data from one or more sensors (e.g., a first sensor or a first set of sensors), such as sensors of the camera system 220, the LiDAR system 222, the GNSS receiver 208, and/or the IMU 224. The data may be or include a set of object location data. The set of object location data can include data of an object (e.g., data depicting the object) in the environment surrounding the vehicle 102. In some cases, the data can include LiDAR data or radar data.

The object tracking module 230 can receive the set of object location data. The object tracking module 230 can receive the set of object location data from any number of sensors of the perception system 250. The object tracking module 230 can generate a measured representation of the object. The measured representation of the object can be or include an outline of the object. The object tracking module 230 can generate the measured representation of the object from the set of object location data. For example, the object tracking module 230 can use machine learning or other object recognition techniques on a point cloud (e.g., a LiDAR point cloud or a radar point cloud) of the object. Using object recognition techniques, the object tracking module 230 can use edge recognition techniques to identify the edges of the object. The object tracking module 230 can generate an outline of the object using such object recognition techniques. The outline can be a bounding box with a center, width, height, and/or orientation. In some cases, the outline can be generated based on such a bounding box (e.g., using machine learning techniques or mapping techniques). The outline can correspond with the identified edges from the point cloud. The outline can be a defined shape, such as a square or rectangle. The object tracking module 230 can identify an outline of the object using any technique. In some cases, the object tracking module 230 can use one or more rules or machine learning techniques to "fill in" portions of the outline that are not included in the set of object location data, such as portions of the object that are not depicted in the set of object location data.

The object tracking module 230 can generate a virtual representation of the object represented in the object location data. The virtual representation of the object can be a tracked representation of the object. The virtual representation of the object can be or include an outline of the object. The object tracking module 230 can generate the virtual representation of the object based on the measured representation of the object. The virtual representation of the object can be or include an outline of the object. The object tracking module 230 can generate the virtual representation of the object based on the measured representation (e.g., data of the measured representation) of the object. For example, the object tracking module 230 can input the different points of and/or the outline itself, into a tracking protocol (e.g., a computer model that is configured to use Gaussians to estimate the current location of the object). In one example, the tracking protocol can be or include a Gaussian filter or a Kalman filter configured to predict an object's location or new location (e.g., a new state) based on measurements captured by one or more sensors. The object tracking module 230 can execute the tracking protocol to output a virtual representation of the object that includes an outline (e.g., one or more points of the outline) indicating a prediction or an estimate of the location, width, height, orientation, etc., of the object. In some cases, the object tracking module 230 can execute the tracking protocol to generate a shape that matches the shape of the measured representation of the object.

The object tracking module 230 can determine a virtual point of the outline of the virtual representation that is nearest to a defined location (e.g., the location of the processor 210, a sensor, or any other location) of the vehicle 102. For example, the object tracking module 230 can compare the set of object location data to the defined location of the vehicle 102 using a distance formula to determine distances between different portions of the set of object location data and the defined location. The object tracking module 230 can determine the portion of the set of object location data that is closest to the defined location of the vehicle 102. The object tracking module 230 can determine the portion or point of the outline of the virtual representation that corresponds to the portion of the set of object location data that is closest to the defined location of the vehicle 102 to identify the virtual point that is closest to the vehicle 102.

In some embodiments, the object tracking module 230 can identify the closest point to the vehicle 102 on the outline of the virtual representation of the object. To do so, for example, the object tracking module 230 can identify different points on the outline of the virtual representation that correspond to an edge of a vehicle that is passing the vehicle 102. The object tracking module 230 can identify the different points that correspond to the edge and determine the distances between the different points to the defined location of the vehicle 102. From the different points, the object tracking module 230 can identify the point that is closest to the defined location of the vehicle 102. In this way, the object tracking module 230 can identify the virtual point on the outline of the virtual representation of the passing vehicle that corresponds to the identified point on the edge to identify the point on the outline that is nearest to the defined location of the vehicle 102.

The object tracking module 230 can translate the virtual point nearest to the vehicle 102 to a measured point on the measured outline of the vehicle 102. For example, the object tracking module 230 can generate a frame of the virtual representation of the object. The frame can surround or encompass the outline of the virtual representation of the object. The frame can include a coordinate system (e.g., an <x,y> coordinate system) in which the outline of the virtual representation corresponds to different points on the coordinate system. The object tracking module 230 can identify the coordinates of the virtual point of the outline determined to be nearest to the defined location of the vehicle 102.

The object tracking module 230 can generate a frame of the measured representation of the object. The frame can surround or encompass the outline of the measured representation of the object. The frame can include a coordinate system (e.g., an <x,y> coordinate system that matches the coordinate system of the frame of the virtual representation of the object) in which the outline of the virtual representation corresponds to different points on the coordinate system. The frame can include a coordinate system that causes the outline of the virtual representation to match the outline of the measured representation of the object. The object tracking module 230 can identify the coordinates of the frame of the measured representation of the object that match the coordinates of the virtual point of the virtual representation of the object that is nearest to the defined location of the vehicle 102. The object tracking module 230 can insert a label or point into the identified location to identify the point on the outline of the measured representation of the vehicle that corresponds to the nearest point on the object to the defined location of the vehicle 102.

The object tracking module 230 can use the identified point on the outline of the measured representation of the object to determine various characteristics of the object. For example, after performing the above technique to determine the point on the outline of the measured representation of the object, the object tracking module 230 can repeat the process using a second set of data from the sensor to generate a second measured representation of the object and a second virtual representation of the object. In the repeated process, the object tracking module 230 can determine another point of the outline of the second measured representation of the object from the virtual point of the second virtual representation of the object that corresponds to a location nearest to the defined location of the autonomous vehicle 102. The object tracking module 230 can compare the differences in location of the identified measured points between the two iterations of the process to determine a velocity or acceleration of the object. In some cases, the object tracking module 230 can compare the differences in location of identified virtual points between the two iterations to determine the velocity or acceleration of the object. By performing this process, the object tracking module 230 can determine the velocity or acceleration of objects while avoiding errors caused by jumps that may occur as the object tracking module 230 receives more data regarding an object. The object tracking module 230 can transmit the determined characteristics of the object to the vehicle control module 206 to use to control the vehicle 102.

FIG. 3 shows execution steps of a processor-based method using the system 250, according to some embodiments. The method 300 shown in FIG. 3 comprises execution steps 302-310. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously.

FIG. 3 is described as being performed by a data processing system stored on or otherwise located at a vehicle, such as the autonomy system 250 depicted in FIG. 2. However, in some embodiments, one or more of the steps may be performed by a different processor, server, or any other computing feature. For instance, one or more of the steps may be performed via a cloud-based service or another processor in communication with the processor of an autonomous vehicle and/or the autonomy system of such an autonomous vehicle.

Using the method 300, the data processing system may use anchor point tracking to determine characteristics (e.g., velocity, acceleration, or positioning) of objects in the environment surrounding an autonomous vehicle in which the data processing system is located. For example, an autonomous vehicle (or any other type of vehicle, such as a semi-autonomous or manually driven vehicle) may include one or more cameras or other types of sensors. The sensors can provide different sets of data to the data processing system over time. From a set of object location data generated by a sensor, the data processing system can generate a measured representation of an object in the environment surrounding the autonomous vehicle. The data processing system can generate a virtual representation of the object by executing a tracking protocol using the measured representation or data used to generate the measured representation as input. The data processing system can identify a virtual point on the virtual representation of the object that corresponds to a nearest location of the object to a defined location of the autonomous vehicle. The data processing system can translate the virtual point to a measured point of the measured representation of the object. The data processing system can repeat the process and use the translated points on the measured representation of the object to determine characteristics of the object, such as the velocity or acceleration of the object. In some cases, the data processing system compares the virtual points on the virtual representation of the object or the measured points on the measured representation of the object to determine such characteristics. The data processing system can transmit such characteristics to a controller of the autonomous vehicle to use to control the autonomous vehicle (e.g., determine a path for maneuvering the autonomous vehicle).

For example, at step 302, the data processing system receives a set of object location data. The data processing system can receive the set of object location data from a sensor. The data processing system may be stored locally at (e.g., in) an autonomous vehicle or remote from the autonomous vehicle. The sensor may be located at (e.g., on) a surface (e.g., an outer surface) of the autonomous vehicle. The sensor may be or include a camera, a LiDAR sensor, a radar sensor, a video recorder, or some other video capture device or data collection device. The sensor can be configured to generate and/or provide object location data (e.g., imagery, LiDAR data, etc.) of an environment surrounding the autonomous vehicle. The sensor can generate the set of object location data as the autonomous vehicle is driving (e.g., driving down the road).

The set of object location data can include or indicate an object. The object can be any object, such as another vehicle, a pedestrian, a cyclist, an animal, etc. The set of object location data can include data regarding an instance of the object. The data processing system can receive the set of object location data from the sensor and analyze the set of object location data.

At step 304, the data processing system generates a measured representation of the object. The data processing system can generate the measured representation of the object based on the set of object location data. For example, the data processing system can generate an outline of the object from the set of object location data. The outline generated from the set of object location data can be an outline of the measured representation of the object or be the measured representation of the object. The data processing system can generate the outline by identifying various edges of the object, such as by using object recognition techniques or by using edge detection techniques on the set of object location data. The data processing system can identify points of the edges of the object and determine points of an outline of a defined shape (e.g., a square or rectangle) that correspond to the points of the edges. The data processing system can generate the outline of the object for the measured representation to include points that correspond to the identified points on the edges of the object. For example, the data processing system can map points of the identified edges from the set of object location data to points of the outline. The defined outline can be the measured representation of the object.

In mapping the points of the identified edges of the object to an outline, the data processing system can establish a size and/or orientation of the outline. For example, the outline can have a defined shape, such as a square or a rectangle. The data processing system can map different points of the set of object location data to the outline and determine an orientation (e.g., a pose or a position) of the object from the set of object location data. The data processing system can additionally establish or determine a size of the object based on the mapped points of the set of object location data, such as by identifying the number of points in the edges of the object from the set of object location data. The data processing system can determine the size and/or orientation of the object using any technique.

The data processing system can "fill in" any points of the defined outline of the object for which the set of object location data does not include any corresponding data. For example, the data processing system can map points of the set of object location data to defined locations on the defined outline. However, there may be gaps in the set of object location data in which an edge of the object is not represented, such as a side of a vehicle that is not visible to the sensor that generated or collected the set of object location data. The data processing system can use a machine learning model or one or more rules to fill in the gaps to generate the outline of the object.

In some cases, the data processing system can adjust the outline to have a defined shape. For example, the data processing system can generate an outline of an object to be a rectangle. The data processing system can adjust or translate the outline to have another shape, such as an ellipse. The data processing system can do so by mapping the points of the rectangle outline to points of an ellipse. In some cases, the data processing system can adjust the rectangle to be an ellipse such that the endpoints of the ellipse touch the corresponding centers of the edges of the rectangle.

At step 306, the data processing system executes a tracking protocol. The data processing system can execute the tracking protocol using data of the measured representation (e.g., detected objects of the measured representation, the outline of the measured representation, the measured representation itself, data that was used to generate the measured representation, etc.) as input. The tracking protocol can be or include a Gaussian filter or a Kalman filter configured to predict an object's location or new location (e.g., a new state) based on measurements captured by one or more sensors. The data processing system can execute the tracking protocol using the data of the measured representation as input to cause the tracking protocol to output a virtual representation of the object.

The virtual representation of the object can be similar to the measured representation of the object. For example, the virtual representation of the object can include one or more points of an outline, or an outline itself, in a defined shape. The shape can be the same shape as the outline of the measured representation. Each of the points of the outline of the virtual representation of the object can correspond to a different point on an edge of the object.

In generating the virtual representation of the object, the data processing system can establish a size and/or orientation of the outline. For example, the outline can have a defined shape, such as a square or a rectangle. The defined shape for the outline of the virtual representation can be the same as the defined shape of the outline for the measured representation of the object. The data processing system can additionally establish or determine a size of the object such as by identifying the number of points in the edges of the object output by the tracking protocol. The data processing system can determine the size and/or orientation of the object for the virtual representation using any technique.

The data processing system can "fill in" any points of the defined outline of the object for which the tracking protocol does not output any corresponding data. For example, the data processing system can map points output by the tracking protocol to defined locations on the defined outline. However, there may be gaps in the output point in which an edge of the object is not represented, such as a side of a vehicle that is not visible to the sensor that generated or collected the set of object location data. The data processing system can use a machine learning model or one or more rules to fill in the gaps to generate the outline of the object.

In some cases, the data processing system can adjust, translate, or convert the outline to have a defined shape (e.g., a defined measured shape). For example, the data processing system can generate an outline of an object to be a rectangle. The data processing system can adjust or translate the outline to have another shape, such as an ellipse. The data processing system can do so by mapping the points of the rectangle outline to points of an ellipse. In some cases, the data processing system can adjust the rectangle to be an ellipse such that the endpoints of the ellipse touch the corresponding centers of the edges of the rectangle.

The data processing system can determine a virtual point of the outline (e.g., the outline prior to any conversion or subsequent to such a conversion) that corresponds to a nearest point on the object to a defined location of the autonomous vehicle. For example, the data processing system can identify the point of the object from the set of object location data that is nearest to the defined location of the autonomous vehicle. The defined location can be any location on the autonomous vehicle, such as at the sensor, the front end of the autonomous vehicle, the back end of the autonomous vehicle, the location of the data processing system, etc. The data processing system can store the defined location in memory. The data processing system can identify different points (e.g., coordinates of points) on the edges of the outline of the virtual representation. The data processing system can use a distance formula for the points comparing the points to the defined location of the autonomous vehicle to determine distances between the points of the outline of the virtual representation and the defined location. The data processing system can identify the point of the edge with the smallest distance to the point of the object nearest the defined location of the autonomous vehicle. The data processing system can identify the point on the outline of the virtual representation of the object that corresponds to the identified point nearest the defined location to identify the virtual point of the virtual representation of the object that corresponds to the nearest point of the object to the defined location of the autonomous vehicle.

The data processing system can identify the point of the outline adjusted to a defined shape that corresponds to the nearest point on the object to the defined location of the autonomous vehicle. For example, subsequent to identifying the virtual point of the outline of the virtual representation that corresponds to the nearest point on the object to the defined location of the autonomous vehicle, the data processing system can translate or adjust the outline to a defined shape (e.g., translate or adjust the outline from a rectangle to an ellipse). The data processing system can identify the point (e.g., the virtual point) on the defined shape that corresponds to the previously identified point on the non-adjusted outline.

At step 308, the data processing system translates the virtual point of the virtual representation of the object to a measured point of the measured representation of the object. The determined virtual point can be the virtual point of the virtual representation of the object that corresponds to the nearest point on the object to the defined location on the autonomous vehicle. The data processing system can translate the virtual point using a coordinate system. For example, the data processing system can generate a frame (e.g., a virtual frame) that surrounds or otherwise encompasses the outline of the virtual representation of the object. The frame can be or include an <x,y> graph. Different points on the outline of the virtual representation of the object can correspond to different coordinates (e.g., virtual coordinates) of the frame. The data processing system can identify the coordinates of the virtual point from the frame.

The data processing system can generate a frame (e.g., a measured frame) that surrounds or otherwise encompasses the outline of the measured representation of the object. The frame for the measured representation of the object can include an <x,y> graph similar to the frame of the virtual representation of the object. The data processing system can generate and/or orient the frame such that the coordinates between the two representations match each other (e.g., corresponding points of the two outlines can correspond to the same coordinates).

The data processing system can map the virtual point of the virtual representation of the object to a corresponding location (e.g., a measured location or the measured point) on the frame of the measured representation of the object. The data processing system can do so by identifying the coordinates of the frame for the measured representation of the object that match the coordinates of the virtual point of the frame for the virtual representation of the object. The data processing system can store an indication of the measured representation and the identified point on the measured representation of the object in memory, in some cases in addition to an indication of the virtual representation and the virtual point on the virtual representation of the object in memory.

The data processing system can use the measured point to determine one or more characteristics of the object. For instance, the data processing system can use the measured point to determine speed, velocity, acceleration, location, etc., of the object. For example, the data processing system can determine the measured point is the location of the object, such as the location relative to the autonomous vehicle. In another example, the data processing system can repeat the process of determining the measured point of the object for another set of data provided by the sensor. For instance, subsequent to determining the measured location of the object, the data processing can receive a second set of object location data from the sensor. The data processing can use the systems and methods described herein to determine a second measured representation of the object and a second virtual representation of the object based on the second set of object location data. The data processing system can determine a second virtual point nearest to the defined location of the autonomous vehicle. The data processing system can translate the second virtual point nearest to the defined location of the autonomous vehicle to the second measured representation of the object to determine a second measured point of the object.

The data processing system can use the measured point of the object and the second measured point of the object to determine or calculate one or more characteristics of the object. For example, the data processing system can calculate a difference in location between the two translated measured points of the object that are nearest to the defined location of the autonomous vehicle. The difference in location can be a difference in location relative to the defined location of the autonomous vehicle. For example, when determining the locations of measured points of the object, the data processing system can determine the locations of the measured points relative to the autonomous vehicle. The data processing system can do so by setting the frames of the measured representation of the autonomous vehicle at determined distances (e.g., the data processing system can determine the distances of the object from the defined location of the autonomous vehicle using object recognition techniques on the set of object location data and the second set of object location data) from the defined location of the autonomous vehicle. Each coordinate of the frames can correspond to a different distance from the defined location of the autonomous vehicle. The data processing system can compare distances of the translated measured points between each other to determine a difference in the distances. The difference can be the distance traveled by the object relative to the autonomous vehicle.

The data processing system can determine a velocity of the object based on the difference in the distances. For example, the set of object location data can correspond to a first timestamp and the second set of object location data can correspond to a second timestamp. The timestamps can indicate the times in which the sets of data were generated or collected by the data processing system. The data processing system can subtract the first timestamp from the second timestamp to determine a change in time between the sets of data. The data processing system can divide the difference in distances by the change in time to determine the velocity of the object.

In some cases, the data processing system can determine the velocity of the object considering the velocity of the autonomous vehicle on which the data processing system and the sensor are located. For example, the velocity calculated based only on the change in distance of the object may be a velocity of the object relative to the autonomous vehicle. To determine an absolute velocity of the autonomous vehicle, the data processing system may take the velocity of the autonomous vehicle into account. For example, the data processing system can identify the current velocity of the autonomous vehicle from memory or from a controller controlling the autonomous vehicle. The data processing system can aggregate the current velocity of the autonomous vehicle with the relative velocity of the object to determine the absolute velocity, or the velocity, of the object. The data processing system can repeat the process of determining the velocity of the object for any number of iterations.

The data processing system can determine the velocity of the object using the velocity determined based on translated measured points of an object. For example, the data processing system can determine the velocity (e.g., the absolute velocity) of an object as described above using object location data from the sensor (e.g., subsequently collected object location data from the same sensor). The data processing system can determine such a velocity at two different times. The data processing system can use the determined velocities to determine the acceleration by subtracting an initial velocity from the final velocity and dividing the result by a difference in the two different times. The data processing system can repeat the process of determining the acceleration of the object for any number of iterations.

In some cases, the data processing system can determine the velocity and acceleration of an object using the virtual point of the virtual representation that corresponds to the nearest location of an object to a defined location of the autonomous vehicle. For example, the data processing system can perform the above-described process of determining the changes in location of such a virtual point relative to the defined location of the autonomous vehicle. The data processing system can use the changes in location to determine the velocity and acceleration as described above. Because the data processing system uses the nearest point of the object instead of a center point to determine the characteristics of the object, the data processing system can avoid calculating sudden changes in the location of the point that may occur when the data processing system determines more information to adjust the size and/or orientation of an outline representing the object.

The data processing system can control the autonomous vehicle based on any characteristics that the data processing system determines based on the object. For example, the data processing system can use the systems and methods described herein to determine a vehicle approaching the autonomous vehicle at a fast velocity. In response, the data processing system can execute a navigational control protocol (e.g., slow down, speed up, or move out of the way) to avoid the approaching vehicle. The data processing system can execute a navigation control protocol based on any characteristics (e.g., velocity or acceleration) of an object. In another example, the data processing system may determine a pedestrian is not moving out of the way fast enough based on a determined velocity or acceleration of the pedestrian. Accordingly, the data processing system may execute a navigational control protocol to cause the autonomous vehicle to slow down or swerve around the pedestrian. In this way, the data processing system can control the autonomous vehicle based on data the data processing system generates using near-point detection on objects in the environment surrounding the autonomous vehicle.

In some cases, instead of automatically controlling the autonomous vehicle, the data processing system can transmit measured points and/or virtual points representing the nearest points of an object to a defined location on the autonomous vehicle. Such may be the case, for example, when the data processing system is a remote computer server (e.g., a cloud server) that receives the sets of data from the autonomous vehicle and processes the data to determine the respective virtual points and/or measured points as described herein. In some instances, the data processing system can be a separate computing device from the computing device controlling the autonomous vehicle. The data processing system can transmit the measured points and/or virtual points to an autonomous vehicle controller of the autonomous vehicle. The autonomous vehicle controller can receive and use the points to determine characteristics of the object and operate (e.g., automatically execute a navigational control protocol) based on the determined characteristics.

In some cases, the data processing can transmit characteristics of an object to an autonomous vehicle controller of the autonomous vehicle. Such may be the case, for example, when the data processing system is either remote from the autonomous vehicle or a separate computing device from the computing device controlling the autonomous vehicle. The data processing system can determine the characteristics of the object and transmit the characteristics to the autonomous vehicle controller of the autonomous vehicle. The autonomous vehicle controller can receive and use the characteristics to operate (e.g., automatically execute a navigational control protocol).

Figure 4:
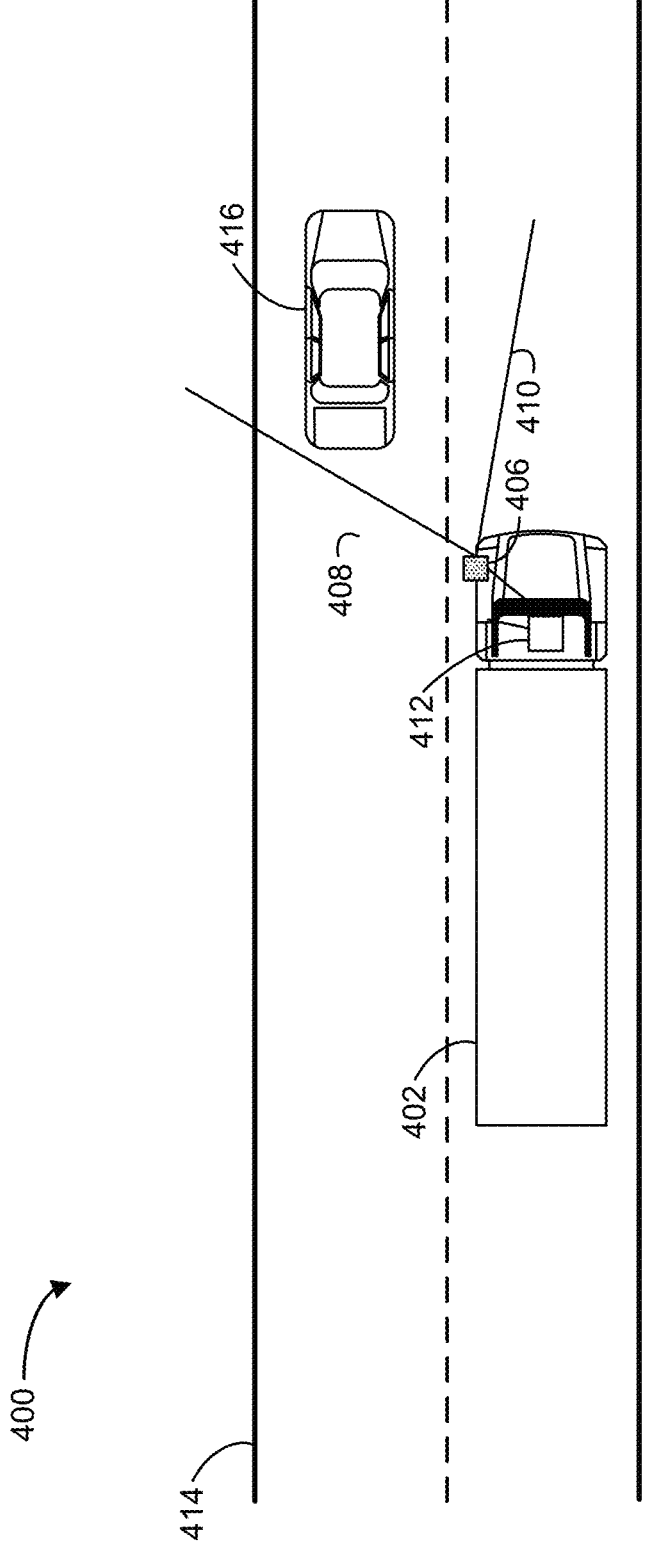
FIG. 4 depicts a bird's-eye view of a roadway scenario of autonomous vehicle anchor point tracking, according to an embodiment.

FIG. 4 depicts a bird's-eye view of a roadway scenario of autonomous vehicle anchor point tracking, according to an embodiment. FIG. 4 illustrates an environment 400 that includes a vehicle 402. The vehicle 402 can be the same as or similar to the vehicle 102. The vehicle 402 can include a sensor 406. The sensor 406 can be a LiDAR sensor, a set of LiDAR sensors, a radar sensor, or a set of radar sensors. The sensor 406 can be any type of sensor. The sensor 406 can have a field-of-view 410. The vehicle 402 can include a data processing system 412. The data processing system 412 can include one or more processors and memory. The data processing system 412 can be the same as or similar to the autonomy system 250, as described with reference to FIG. 2.

The sensor 406 can capture or generate sets of object location data regarding the environment surrounding the vehicle 402 as the vehicle 402 travels down a road 414. The sensor 406 can transmit the sets of object location data to the data processing system 412. The data processing system 412 can receive the sets of object location data, process the sets of object location data, and determine characteristics of objects in the environment surrounding the vehicle 402 based on the sets of object location data.

For example, the sensor 406 can capture and transmit a set of object location data. The set of object location data can include data regarding a vehicle 416 that recently passed the vehicle 402. The data processing system 412 can receive the set of object location data. The data processing system 412 can use the set of object location data generated by the sensor 404 to generate an outline of a measured representation of the vehicle 416. The data processing system 412 can use the set of data and/or the outline of the measured representation of the vehicle 416 to generate a virtual representation of the vehicle 416. The data processing system 412 can identify a virtual point on the outline that corresponds to a nearest point of the vehicle 416 to a defined location on the vehicle 402. The data processing system 412 can translate the virtual point of the virtual representation of the vehicle 416 to a corresponding point on the measured representation of the vehicle 416. Accordingly, the data processing system 412 can identify a point on the measured representation of the vehicle that corresponds to the nearest point on the vehicle 416 to the defined location of the vehicle 402.

The data processing system 412 can use the measured point to determine one or more characteristics of the vehicle 416. For example, the data processing system can determine the current location of the vehicle 416 to be at the measured point of the vehicle 416. The data processing system may determine multiple instances of measured points of the vehicle 416 to determine the velocity and/or acceleration of the vehicle 416. The data processing system 412 can use the measured point to determine any characteristic of the vehicle 416.

The data processing system 412 can use the characteristics to control the vehicle 402. For example, the data processing system 412 can determine the vehicle 416 has passed the vehicle 402 and control the vehicle 402 to speed up or switch lanes into the lane of the vehicle 416. The data processing system 412 can execute any navigational control protocol based on the determined characteristics of the vehicle 416. In some cases, the data processing system 412 can transmit the characteristic to a controller controlling the vehicle 402 for similar control.

Figure 5:
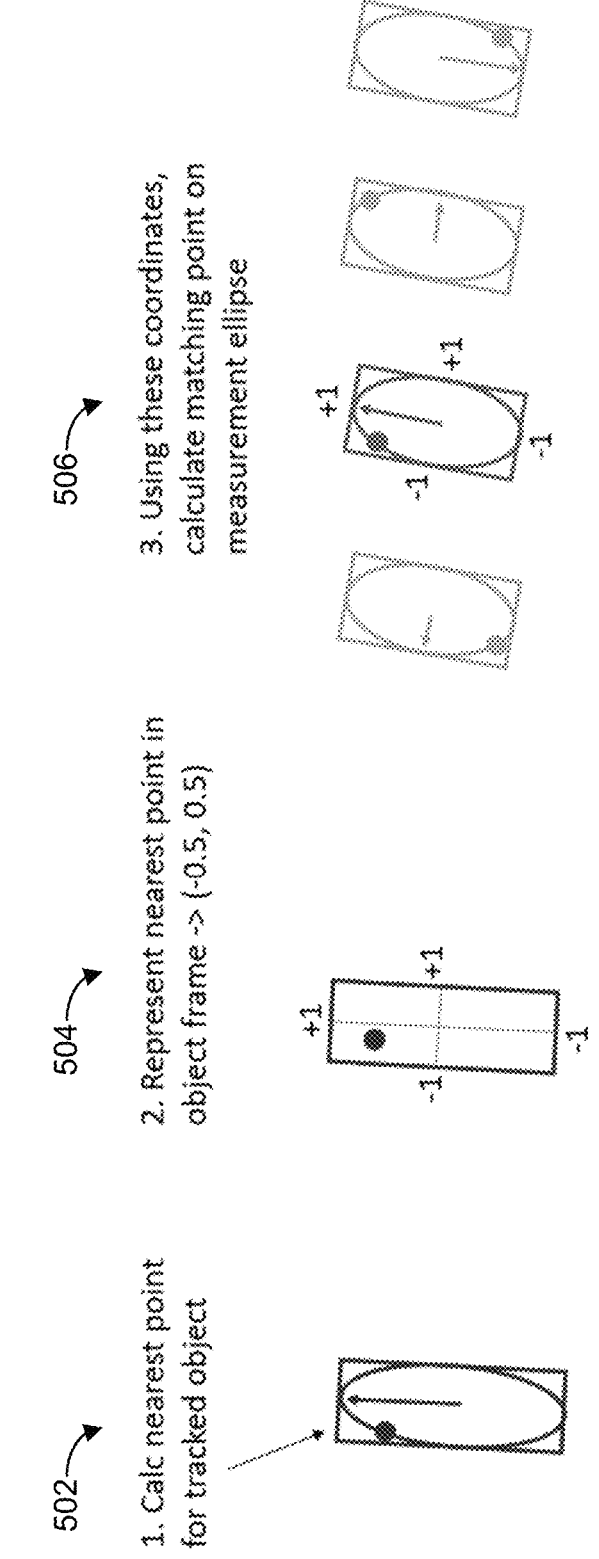
FIG. 5 depicts a sequence of translating a virtual point onto a measured representation of an object, according to an embodiment.

FIG. 5 depicts a sequence 500 of translating a virtual point onto a measured representation of an object, according to an embodiment. The sequence 500 is described as being performed by a data processing system stored on or otherwise located at a vehicle, such as the autonomy system 250 depicted in FIG. 2. However, in some embodiments, one or more of the steps may be performed by a different processor, server, or any other computing feature. For instance, one or more of the steps may be performed via a cloud-based service or another processor in communication with the processor of an autonomous vehicle and/or the autonomy system of such an autonomous vehicle.

At step 502, the data processing system calculates a nearest point on a tracked object (e.g., an object which the data processing system detected from a set of object location data). The data processing system can generate a virtual representation of the object that includes an outline of the object. The data processing system can generate the virtual representation of the object from data of a measured representation of the object using a tracking protocol. The outline of the virtual representation of the object can be a rectangle or any other defined shape. The data processing system can calculate the virtual point on the outline as the nearest point to the autonomous vehicle (e.g., the nearest point on the tracked object) on which the data processing system is located. In some cases, the outline may convert the outline to another shape, such as an ellipse. The data processing system may identify the virtual point to be a point on the converted outline.

At step 504, the data processing system represents (e.g., defines or determines) the nearest point in a frame. The data processing system can generate the frame to include or encompass the outline of the virtual representation of the object. The frame can include a coordinate system in which the points of the outline correspond to different coordinates. The data processing system can identify the coordinates on the frame of the virtual point indicating the nearest point of the object to the defined location of the autonomous vehicle.

At step 506, the data processing system translates the virtual point to a measurement point. The data processing system can translate the virtual point to a point on the measured representation based on which the virtual representation was generated. To do so, the data processing system can generate a frame encompassing or otherwise including an outline of the measured representation of the object. The frame can include a coordinate system matching the coordinate system of the frame of the virtual representation of the object. The data processing system can identify the coordinates of the frame of the measured representation of the object that match the coordinates of the virtual point indicating the nearest point of the object to the defined location of the autonomous vehicle.

Figure 6:
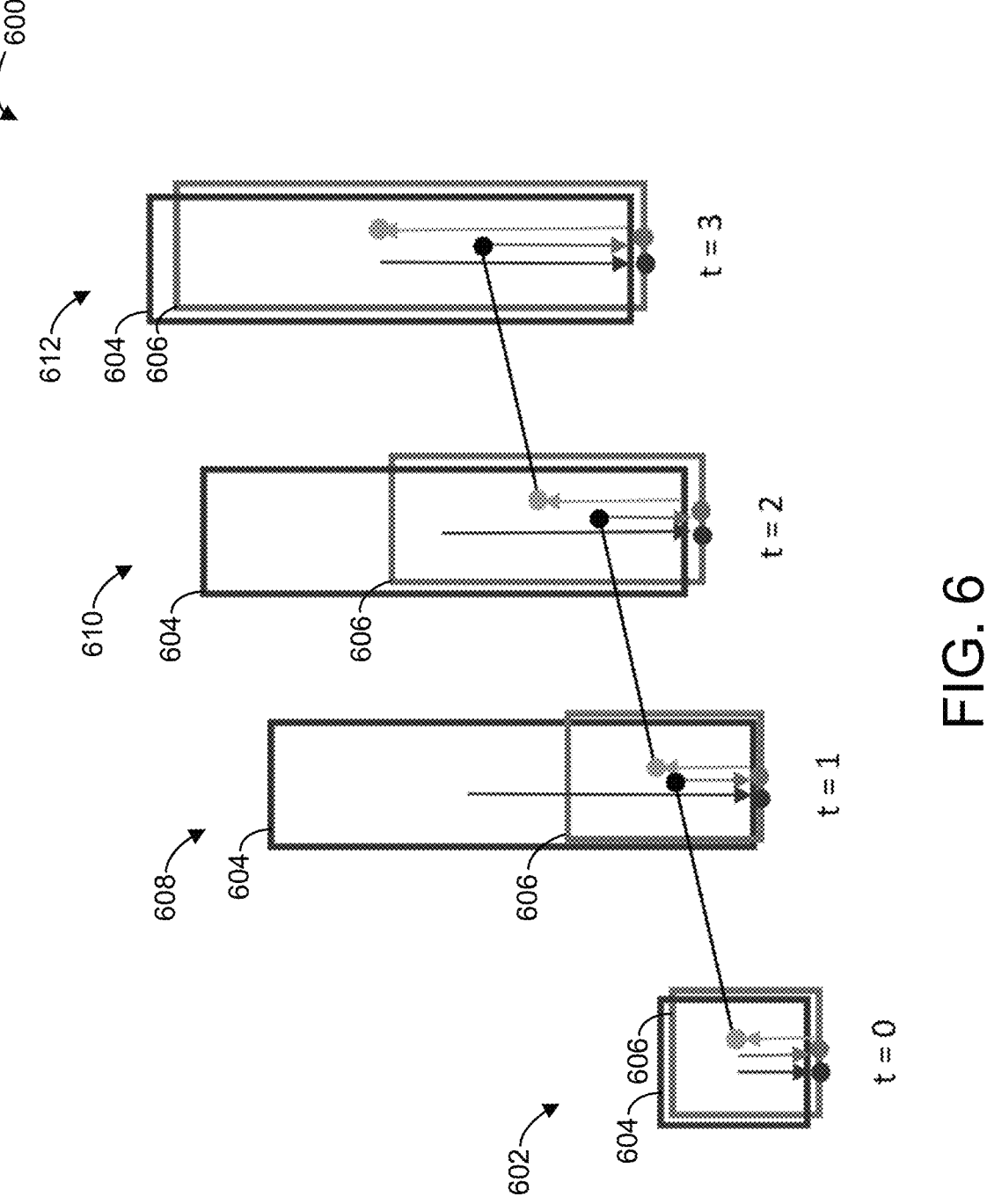
FIG. 6 depicts a block diagram of a sequence for determining characteristics of an object, according to an embodiment.

FIG. 6 depicts a block diagram of a sequence 600 for determining characteristics of an object, according to an embodiment. The sequence 600 is described as being performed by a data processing system stored on or otherwise located at a vehicle, such as the autonomy system 250 depicted in FIG. 2. However, in some embodiments, one or more of the steps may be performed by a different processor, server, or any other computing feature. For instance, one or more of the steps may be performed via a cloud-based service or another processor in communication with the processor of an autonomous vehicle and/or the autonomy system of such an autonomous vehicle.

At step 602, the data processing system generates outlines of a measured representation 604 of an object and a virtual representation 606 of the same object. The data processing system can do so at t=0 using a set of object location data from a sensor of the autonomous vehicle. The data processing system can identify the nearest points to a defined location of an autonomous vehicle on both of the outlines 604 and 606 using the systems and methods described herein. The data processing system can shift the location of the nearest point to a center point of the outline of the virtual representation 606.

At step 608, the data processing system repeats the process of step 602 at t=1 using a second set of object location data from the sensor. In doing so, the data processing system can generate the outlines 604 and 606 to be larger. The data processing can identify the nearest points of both of the outlines 604 and 606. The data processing system can shift the location of the nearest point to a center of the larger outline 606. The data processing system can determine a change in location between the nearest points calculated in steps 602 and 608 as well as a change in location of the center points calculated in steps 602 and 608. The data processing system can determine the velocity of the object based on the change in location of the nearest points or based on the change in location of the center points (e.g., the change in location of the center points minus the shift in location of the center point relative to the nearest point of the outline 606 between t=0 and t=1). The data processing system can repeat this process in steps 610 and 612 and any number of further times to determine characteristics of the object over time.

Accordingly, the data processing system can perform the sequence 600 to decouple any relationship between the size of an outline of a virtual representation of an object and the velocity of the object by maintaining a record of determined outlines, center points, and nearest points over time to determine characteristics of the object.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. An autonomous vehicle, comprising:

a sensor configured to generate object location data of an environment surrounding the autonomous vehicle; and one or more processors, wherein the one or more processors are configured to:

receive a set of object location data from the sensor, the set of object location data indicating an object within the environment, the object present in a field of view of the sensor;

generate a measured representation of the object based on the set of object location data;

track the object by executing a tracking protocol using data of the measured representation of the object as input to generate a virtual representation of the object, the virtual representation of the object comprising a virtual point located on an outline of the object, the virtual point corresponding to at least one of i) a portion of the set of object location data nearest to a defined location of the autonomous vehicle or ii) a point of the outline nearest to the defined location of the autonomous vehicle; and translate the virtual point of the virtual representation of the object to a measured point of the measured representation of the object.

2. The autonomous vehicle of claim 1, wherein the one or more processors are configured to generate the virtual representation of the object by:

generating the outline of the object based on the data of the measured representation of the object; and adjusting the outline to a defined shape of the virtual representation of the object.

3. The autonomous vehicle of claim 2, wherein the one or more processors are configured to adjust the outline to the defined shape of the virtual representation of the object by adjusting the outline of the object from a rectangle to an ellipse.

4. The autonomous vehicle of claim 2, wherein the one or more processors are configured to determine the virtual point by:

determining the point of the outline of the object that is nearest to the defined location of the autonomous vehicle; and adjusting the point of the outline to the virtual point of the defined shape based on the virtual point corresponding to the point of the outline.

5. The autonomous vehicle of claim 1, wherein the one or more processors are configured to generate the virtual representation of the object by generating a rectangle outline of the object based on the data of the measured representation of the object.

6. The autonomous vehicle of claim 1, wherein the one or more processors are configured to generate the measured representation of the object by:

mapping measurements of the object from the set of object location data to a measured outline; and converting the measured outline to a defined measured shape of the measured representation of the object.

7. The autonomous vehicle of claim 1, wherein the one or more processors are configured to translate the determined virtual point of the virtual representation of the object to the measured point of the measured representation of the object by:

determining virtual coordinates of the virtual point based on a location of the virtual point within a virtual frame surrounding the virtual representation of the object; and mapping the virtual coordinates of the virtual point to a corresponding location on a measured frame surrounding the measured representation of the object, wherein the corresponding location on the measured frame is the measured point of the measured representation of the object.

8. The autonomous vehicle of claim 1, wherein the one or more processors are further configured to:

determine a velocity or an acceleration of the object based at least on the measured point; and execute a navigational control protocol based on the determined velocity or acceleration of the object.

9. The autonomous vehicle of claim 8, wherein the one or more processors are configured to determine the velocity or the acceleration of the object by:

determining a second measured representation of the object based on a second set of object location data;

determining a second virtual representation of the object and a second virtual point nearest to the defined location of the autonomous vehicle based on data of the second measured representation of the object;

translating the second virtual point nearest to the defined location of the autonomous vehicle to a second measured point of the second measured representation of the object; and calculating a difference in location between the measured point and the second measured point.

10. The autonomous vehicle of claim 8, wherein the one or more processors are configured to transmit the velocity or the acceleration to an autonomous vehicle controller configured to control the autonomous vehicle.

11. The autonomous vehicle of claim 1, wherein the one or more processors are configured to transmit the measured point to an autonomous vehicle controller configured to control the autonomous vehicle.

12. A method, comprising:

receiving, by one or more processors of an autonomous vehicle from a sensor of the autonomous vehicle, a set of object location data, the set of object location data indicating an object in an environment surrounding the autonomous vehicle, the object present in a field of view of the sensor;

generating, by the one or more processors, a measured representation of the object based on the set of object location data;

tracking the object by executing, by the one or more processors, a tracking protocol using data of the measured representation of the object as input to generate a virtual representation of the object, the virtual representation of the object comprising a virtual point located on an outline of the object, the virtual point corresponding to at least one of i) a portion of the set of object location data nearest to a defined location of the autonomous vehicle or ii) a point of the outline nearest to the defined location of the autonomous vehicle; and translating, by the one or more processors, the virtual point of the virtual representation of the object to a measured point of the measured representation of the object.

13. The method of claim 12, wherein generating the virtual representation of the object comprises:

generating, by the one or more processors, the outline of the object based on the data of the measured representation of the object; and adjusting, by the one or more processors, the outline to a defined shape of the virtual representation of the object.

14. The method of claim 13, wherein adjusting the outline to the defined shape of the virtual representation of the object comprises adjusting, by the one or more processors, the outline of the object from a rectangle to an ellipse.

15. The method of claim 13, wherein determining the virtual point comprises:

determining, by the one or more processors, the point of the outline of the object that is nearest to the defined location of the autonomous vehicle; and adjusting, by the one or more processors, the point of the outline to the virtual point of the defined shape based on the virtual point corresponding to the point of the outline.

16. The method of claim 12, wherein generating the virtual representation of the object comprises generating, by the one or more processors, a rectangle outline of the object based on the set of object location data.

17. The method of claim 12, wherein generating the measured representation of the object comprises:

mapping, by the one or more processors, measurements of the object from the set of object location data to a measured outline; and converting, by the one or more processors, the measured outline to a defined measured shape of the measured representation of the object.

18. The method of claim 12, wherein translating the virtual point of the virtual representation of the object to the measured point of the measured representation of the object comprises:

determining, by the one or more processors, virtual coordinates of the virtual point based on a location of the virtual point within a virtual frame surrounding the virtual representation of the object; and mapping, by the one or more processors, the virtual coordinates of the virtual point to a corresponding location on a measured frame surrounding the measured representation of the object, wherein the corresponding location on the measured frame is the measured point of the measured representation of the object.

19. The method of claim 12, further comprising:

determining, by the one or more processors, a velocity or an acceleration of the object based at least on the measured point; and executing, by the one or more processors, a navigational control protocol based on the determined velocity or acceleration of the object.

20. The method of claim 19, wherein determining the velocity or the acceleration of the object comprises:

determining, by the one or more processors, a second measured representation of the object based on a second set of object location data;

determining, by the one or more processors, a second virtual representation of the object and a second virtual point nearest to the defined location of the autonomous vehicle based on data of the second measured representation of the object;

translating, by the one or more processors, the second virtual point nearest to the defined location of the autonomous vehicle to a second measured point of the second measured representation of the object; and calculating, by the one or more processors, a difference in location between the measured point and the second measured point.

\*   \*   \*   \*   \*